(12) United States Patent
Quinn et al.

(10) Patent No.: US 6,344,517 B1
(45) Date of Patent: Feb. 5, 2002

(54) METHOD OF USING AN AQUEOUS COMPOSITION CONTAINING A WATER-SOLUBLE OR WATER-DISPERSIBLE SYNTHETIC POLYMER AND AQUEOUS METAL WORKING FLUID COMPOSITIONS FORMED THEREOF

(75) Inventors: Robert E. Quinn, Cleveland; Richard A. Denis, Auburn Township; Sanjay N. Kalhan, Richmond Heights, all of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/473,068

(22) Filed: Dec. 28, 1999

Related U.S. Application Data

(63) Continuation-in-part of application No. 09/333,154, filed on Jun. 14, 1999.
(60) Provisional application No. 60/089,349, filed on Jun. 15, 1998.

(51) Int. Cl.$^7$ .................................................. C08F 2/16
(52) U.S. Cl. ..................................................... 524/804
(58) Field of Search .......................................... 524/804

(56) References Cited

U.S. PATENT DOCUMENTS

| | | | | |
|---|---|---|---|---|
| 4,410,366 A | * | 10/1983 | Birchall | 106/90 |
| 4,820,380 A | * | 4/1989 | OCallaghan | 162/135 |
| 5,106,609 A | * | 4/1992 | Bolich | 424/70 |
| 5,277,899 A | * | 1/1994 | McCall | 424/71 |
| 5,580,550 A | * | 12/1996 | Gough | 424/70.11 |
| 5,587,145 A | | 12/1996 | Lion et al. | 424/45 |
| 5,620,684 A | | 4/1997 | Dupuis | 424/70.12 |
| 5,855,878 A | * | 1/1999 | Coffindaffer | 424/70.11 |
| 5,863,973 A | * | 1/1999 | Carder | 524/388 |
| 6,020,291 A | | 2/2000 | Lange et al. | 508/404 |

FOREIGN PATENT DOCUMENTS

| | | | |
|---|---|---|---|
| EP | 361 592 | 9/1988 | 11/173 |
| EP | 750 899 | 1/1997 | |
| EP | 811 677 | 12/1997 | 173/2 |
| EP | 921 185 A2 | 6/1999 | |

* cited by examiner

Primary Examiner—Edward J. Cain
(74) Attorney, Agent, or Firm—David M. Shold; Michael F. Esposito

(57) ABSTRACT

The present invention relates to a metalworking fluid composition comprising an aqueous composition or dispersion containing a water-soluble or water-dispersible synthetic polymer, and method of use thereof. The aqueous composition or dispersion is added to a metal working fluid composition to impart aerosol control and shear stability.

11 Claims, 1 Drawing Sheet

METHOD OF USING AN AQUEOUS COMPOSITION CONTAINING A WATER-SOLUBLE OR WATER-DISPERSIBLE SYNTHETIC POLYMER AND AQUEOUS METAL WORKING FLUID COMPOSITIONS FORMED THEREOF

RELATED APPLICATIONS

This application is a continuation-in-part application of parent application Ser. No. 09/333,154, filed Jun. 14, 1999 which is the converted, nonprovisional application of parent, provisional application Ser. No. 60/089,349 filed on Jun. 15, 1998, both incorporated herein by reference in their entirety, and to which priority is claimed herewith.

TECHNICAL FIELD

The present invention relates to a method of using an aqueous composition or dispersion containing a water-soluble or water-dispersible synthetic polymer, and metal working fluid composition formed thereof.

BACKGROUND OF THE INVENTION

The present invention relates to a method of using an aqueous composition or dispersion containing a water-soluble or water-dispersible synthetic polymer, and to the resultant metal working fluid composition formed thereof. When added to a metal working fluid composition, the aqueous composition or dispersion imparts desirable properties to the resultant metal working fluid composition.

A variety of compositions or materials are needful of certain properties to obtain a desirable end product.

Shear stability of the composition is needed under spraying conditions due to the shear stress the composition undergoes under spraying conditions at the discharge point at the nozzle and also the shear input experienced at the pump.

The shear rate that a composition is typically subjected to at the discharge point of the nozzle or at the pump can be as low as zero to as high as $10^6$ reciprocal seconds, i.e., from 0 to $10^6$ $s^{-1}$. Low shear is from 1,000 to 99,000 $s^{-1}$. High shear is greater than 99,000 $s^{-1}$. In terms of shear stress, the shear stress that a composition is typically subject to at the nozzle or at the pump can be from 1 pascal to 30,000 pascals.

That is, a composition sprayed from a sprayer undergoes shear stress. Under these conditions, the composition is released in the form of droplets. Often the droplets are small enough to be classified as a mist or an aerosol. Misting, or the formation of a mist, is considered undesirable, because it represents a loss of fluid. Also, the mist or aerosol created is considered a contaminant in the surrounding air. For example, an aerosol, upon discharge from a sprayer, can disperse beyond a selected target area, and can therefore contaminate crops or harm persons in a vicinity located beyond the selected target area. Therefore, it is very beneficial to impart aerosol control or mist control properties, referred to as an effective amount of antimist performance, to such compositions to prevent these undesirable effects created by misting.

Metal cutting operations often involve a work piece which rotates at relatively high speed, and a cutting tool both of which are lubricated by a metal working fluid. Under these conditions, the metal working fluid is frequently thrown from the surface of the metal in the form of droplets. Often the droplets are small enough to be classified as a mist. Misting, or the formation of a mist is considered undesirable, because it represents a loss of the cutting fluid, and the cutting fluid mist is considered a contaminant in the air around the cutting machine. Therefore, mist control during metal working operations is desirable.

SUMMARY OF THE INVENTION

The present invention provides a method of using an aqueous composition or dispersion containing a water-soluble or water-dispersible synthetic polymer, wherein said aqueous composition or dispersion imparts aerosol control in combination with shear stability to a metal working fluid composition, whereby the resultant metal working fluid composition sustains a shear rate range of from about 1 to about 1,000,000 $s^{-1}$, and sustains a shear stress range of from about 1 pascal to about 500,000 pascals.

When shear stability is a property to be imparted according to the present invention, shear rate and shear stress under metal working conditions are factors in determining performance of a composition regarding shear stability.

When the aqueous composition or dispersion containing the polymer according to the present invention is added to a metal working fluid composition, the resultant composition has a shear stability such that it can sustain a shear rate range of from about 1 to about 1,000,000 $s^{-1}$, and can sustain a shear stress range of from about 1 pascal to about 500,000 pascals.

The present invention therefore provides for the ability to impart properties including aerosol control in combination with shear stability to a metal working fluid composition.

In a preferred embodiment, the aqueous composition or dispersion according to the present invention and as utilized in the resultant metal working fluid composition according to the present invention, comprises a polymer that is a copolymer formed by copolymerizing (A) a hydrophobic monomer selected from the group consisting of A(I) an alkyl substituted acrylamide compound having the formula:

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and A(II) an acrylate ester of the following formula:

where $R_1$ is a hydrogen or a methyl group and $R_9$ is a hydrocarbyl group containing between 1 and 20 carbon atoms; and (B) a hydrophilic monomer selected from the group consisting of:

B(I) acrylamido sulfonic acids having the formula:

wherein $R_4$ is a hydrogen or a methyl group and R is an aliphatic or aromatic hydrocarbon group containing from 2 to 12 carbon atoms, preferably from 2 to 8 carbon atoms;

B(II) acrylamido disulfonic acids having the formula:

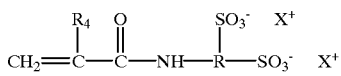

wherein $R_4$ is a hydrogen or a methyl group and R is an aliphatic or aromatic hydrocarbon group containing from 2 to 12 carbon atoms, preferably from 2 to 8 carbon atoms, and B(III) a styrene sulfonic acid having the formula:

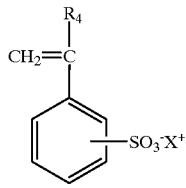

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

$$R_5R_6R_7R_8N^+$$

wherein $R_5$, $R_6$, $R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99. The ratio of moles of A to B for A(I) or for A(II) will vary within these ranges according to the particular method of use and resultant composition selected.

The polymer in the aqueous composition or dispersion according to the present invention and as utilized in the resultant metal working fluid composition of the present invention, also comprises a third monomer unit, (C).

The polymer is prepared by polymerization of the combination of (A), (B), and (C) monomer units. Unit (C) must be polymerizable with units (A) and (B).

DETAILED DESCRIPTION OF THE INVENTION

Figure 1:
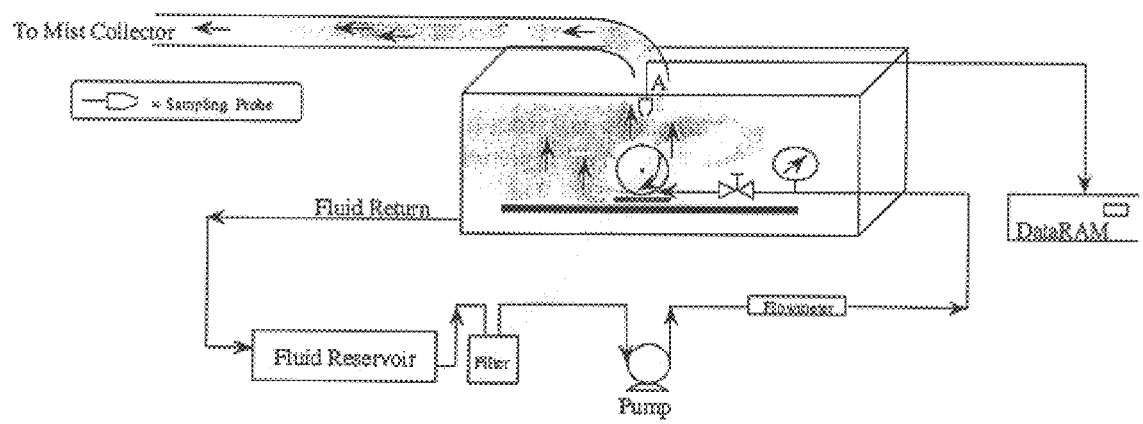
FIG. 1 is a schematic of the grinder antimist test.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:
(1) hydrocarbon substituents, that is, aliphatic (e.g., alkyl or alkenyl), alicyclic (e.g., cycloalkyl, cycloalkenyl) substituents, aromatic-, aliphatic- and acylic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.); and (3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazole, etc. In general, no more than about 2, preferably no more than one, nonhydrocarbon substituent will be present for every ten carbon atoms in the hydrocarbyl group. Typically, there will be no such non-hydrocarbon substituents in the hydrocarbyl group. In that case, the hydrocarbyl group is purely hydrocarbon.

The term "hydrophilic" is used herein consistent with its standard meaning of having affinity for water, whereas "hydrophobic" is used herein consistent with its standard meaning of lacking affinity for water.

The term "water-soluble or water-dispersible synthetic polymer" encompasses a polymer, or mixtures of polymers, capable of imparting, to a composition, a shear stability such that the composition can sustain a shear rate range of from about 1 to about 1,000,000 $s^{-1}$, and can sustain a shear stress range of from about 1 pascal to about 500,000 pascals.

The word "sustain" or "sustains" as used throughout this specification means that the compositions of the present invention have the ability to survive a shear rate range of from about 1 to about 1,000,000 $s^{-1}$ and a shear stress range of from about 1 pascal to about 500,000 pascals over a period of time beginning at a point before the composition is discharged and ending at the moment the composition is discharged. The word "survive" means the composition maintains its mist control properties from the point before discharge to the point after discharge such that effective mist control is achieved. The phrase "effective mist control" means that about 10% to about 100% mist reduction is achieved by the composition during and after discharge.

The polymers suitable for the present invention have a weight average molecular weight of generally greater than about 200,000, and preferably greater than about 500,000. The phrase "weight average molecular weight" is given the well known meaning in the art, and is defined numerically as:

Mw=(sum over all polymer molecules ((number of molecules of a given mass)(that mass^2)))/(sum over all polymer molecules ((number of molecules of a given mass)(that mass))), OR as:

$$M_w = \frac{\sum_{i=1}^{\infty} N_i M_i^2}{\sum_{i=1}^{\infty} N_i M_i}$$

The weight average molecular weight is a weighted average, which favors the high molecular weight molecules.

The value is well known and fundamental in the art. It is measured using well known methods in the art, such as light scattering technique, GPC analysis, and the like.

The Hydrophilic Monomers

The hydrophilic monomers usable in the present invention are ethylenic monomers containing a sulfonate group. Three types of sulfonate monomers have been found to be useful in the present invention.

The first type of hydrophilic monomers are the substituted acrylamides containing a sulfonate group:

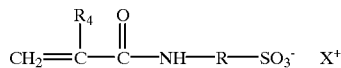

wherein $R_4$ is a hydrogen or a methyl group, and R is an aliphatic or an aromatic hydrocarbon group containing from 2 to 12 carbon atoms, more preferably from 2 to 8 carbon atoms, which acts as a bridge between the nitrogen portion of the acrylamido group and the sulfonate group.

The R group may be branched, as in the molecule 2-acrylamido-2 methylpropane sulfonic acid, which has the following structure:

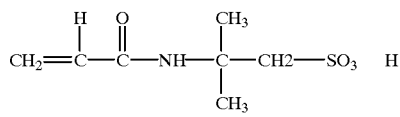

The R group may also include phenyl groups, alkyl substituted phenyl group and cycloaliphatic groups.

The second type of sulfonate monomer are the substituted acrylamides containing two sulfonate group structures:

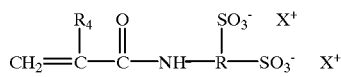

wherein $R_4$ is a hydrogen or a methyl group and R is as defined above for the acrylamides with a single sulfonate group. The sulfonate groups may be attached to the same or different carbon atoms.

The third type of sulfonate monomer is the styrene sulfonate illustrated by the following formula:

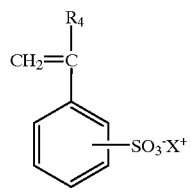

wherein $R_4$ is a H or a methyl group; and $X^+$ is a H or a cation selected from the group consisting of alkali metal cations, alkaline earth cations, cations of the following transition metals: Sc, Ti, V, Cr, Mn, Fe, Co, Ni, Cu, Zn, and ammonium cations of the following formula:

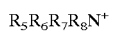

wherein $R_5$, $R_6$, $R_7$, and $R_8$ are independently hydrogen or hydrocarbyl groups, provided that the total number of carbon atoms in an ammonium cation does not exceed 21 carbon atoms.

The Hydrophobic Monomers

The hydrophobic monomer may be an acrylamide or methacrylamide corresponding to the following formula:

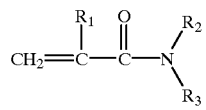

In this formula, $R_1$ may either be a hydrogen or a methyl group corresponding to an acrylamide or a methacrylamide respectively, and $R_2$ and $R_3$ are independently a hydrogen or hydrocarbyl group provided that the total number of carbons in $R_2$ and $R_3$ is in the range of 2 to 36 carbon atoms. Accordingly, when $R_2$ is a methyl group, then $R_3$ must be an alkyl group rather than a hydrogen. It is preferred that the total number of carbon atoms in $R_2$ and $R_3$ be in the range of 4 to 36 carbon atoms, or 4 to 24 carbon atoms, or 4 to 12 carbon atoms. Other preferred ranges for the total number of carbon atoms in $R_2$ and $R_3$ are 8 to 36 carbon atoms, or 8 to 24 carbon atoms, or 8 to 12 carbon atoms, or 4 to 8 carbon atoms.

The hydrophobic monomer may also be an acrylate or methacrylate ester of the formula:

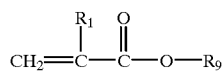

where $R_1$ is a hydrogen or a methyl group and $R_9$ is a hydrocarbyl group containing between 1 and 20 carbon atoms. It is preferred that $R_9$ contain between 2 to 18 carbon atoms, 4 to 18 carbon atoms, 4 to 12, 4 to 8 carbon atoms, 8 to 20 carbon atoms, 8 to 16 carbon atoms, or 8 to 12 carbon atoms.

Component (C), an Additional Monomer Unit

The polymers of the present invention are prepared by the polymerization combination of (A) and (B) and (C) monomers, to form the polymer of the present invention. The (C) monomer is a mono unsaturated monomer other than the monomer as defined by the (A) monomer or as defined by the (B) monomer.

In one embodiment, the (C) monomer is a monomer represented by the formula:

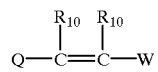

wherein R10 is independently hydrogen or an alkyl group of 1 to 4 carbon atoms, Q is independently hydrogen, an alkyl group of 1 to 4 carbon atoms, an aromatic group, an acid group, an amine or metal salt of an acid group, an ester group, or an amide group; and W is independently an aromatic group, an acid group, an amine or metal salt of an acid group, an ester group, an amide group, a nitrile group, an ether group, a cyclic amide group, or an N-heterocycle group.

The polymers of the present invention contains (C) monomer units in the amount of from about 0.1% to about 80%, preferably from about 5% to about 50%, and more preferably from about 15% to about 30%, by weight of the polymer.

The (C) monomer units are copolymerizable with the (A) and (B) monomer units. Either a single type of (C) unit or combinations or two or more (C) units can be utilized. The (C) units are selected to meet the requirements of the polymer of the present invention.

The word "copolymerizable", as used herein, means that the (C) monomers can be reacted with or polymerized with the (A) and (B) monomers in a polymerization reaction using one or more conventional synthetic techniques.

The (C) monomers can be synthesized utilizing a variety of standard synthetic procedures familiar to the polymer chemist of ordinary skill in the art.

Specifically, component (C) is a vinyl monomer. Preferably, component (C) is an acrylic acid monomer or an acrylamide monomer, or mixtures thereof.

As used herein the term "acrylic monomer" includes acrylic acids, esters of acrylic acids, amine or metal salts of acrylic acids, acrylic amides, and acrylonitriles and the corresponding alkacryl-, especially methacryl-, compounds. The esters of acrylic acids typically contain from about 2 to about 50 carbon atoms in the ester group, which ester group includes the carbonyl carbon atom. Often, the ester groups are lower alkyl esters wherein the expression "lower alkyl" means alkyl groups having fewer than 8 carbon atoms, preferably from 1 to about 4 carbon atoms.

Examples of useful acrylic monomers include acrylic acid, sodium acrylate, methacrylic acid, acrylamide, methacrylamide, N-methylacrylamide, Nmethylmethacrylamide, and the corresponding acrylonitrile and methacrylonitrile.

Also included among "acrylic" monomers are α, β-unsaturated polycarboxylic monomers such as maleic, esters thereof, amides, amidic acids and esters thereof, and the corresponding fumaric compounds.

The term "vinyl monomer" includes vinyl esters, N-vinyl amides, and vinyl substituted aromatics. Examples of useful vinyl monomers include vinyl acetate, N-vinyl-2-pyrrolidinone, N-vinyl caprolactam, 4-vinyl pyridine, and styrene.

The Polymer

The aqueous composition utilized in the methods of using according to the present invention and in the resultant compositions of the present invention, contain a polymer, or mixtures of polymers, formed by the polymerization of the aforementioned hydrophilic monomer and the aforementioned hydrophobic monomer, and the (C) monomer unit.

As mentioned earlier, the hydrophobic monomers include alkyl substituted acrylamides, alkyl substituted methacrylamides, acrylate esters, and methacrylate esters, and the hydrophilic monomers include sulfonate molecules containing a single ethylenic linkage.

In the polymerization reaction, the ethylenic linkages polymerize and the resulting polymer consists of a polyethylene backbone with hydrophilic and hydrophobic side chains.

Formation of the Polymer

The polymer is produced by free radical polymerization. The polymerization is done by well-known free radical methods. The general properties of acrylamide polymers, as well as their methods of preparation are discussed in The Encyclopedia of Polymer Science and Engineering, Volume 1, John Wiley & Sons, 1985 (pp 169–211). The Encyclopedia discusses techniques useful in forming acrylic ester polymers (pp 265–273).

The polymerization may be conducted in solution, and by various suspension or emulsion methods. In solution polymerization, a solvent is selected which allows both the hydrophilic and hydrophobic monomers to be maintained in solution. Mixtures of water, acetic acid, various molecular weight alcohols such as, methanol, ethanol and butyl alcohol, as well as polar solvents such as acetone, acetic acid, tetrahydrofuran, dimethyl sulfoxide, dioxane, dimethyl formamide and N-methylpyrrolidinone.

A wide variety of free radical sources may be used as initiators including persulfates, redox couples, azo compounds, peroxides, and the like. In particular, emulsion polymerization methods may be used to form polymers useful in the present invention.

Measurements of solution viscosity were made by comparing the efflux time t required for a specified volume of copolymer solution to flow through a capillary tube (Ostwald-Fenske capillary viscometer) with the corresponding efflux time to of the solvent. From t, to and the copolymer concentration c, the inherent viscosity is derived based on the following equation:

$$h_{inh} = [\ln(t/t_o)]/c$$

where the concentration c is expressed in grams per deciliter (g/dl). Methanol was used as solvent. All inherent viscosities were measured at 30° C. and c=1.0 g/dl.

The inherent viscosity range of the polymer according to the present invention is from about 0.5 to about 7.0. The inherent viscosity will vary within this range depending upon the particular application, that is, depending upon the selected method of use and resultant composition.

The preferred method of polymerization is solution polymerization under temperatures of from about 20° C. to about 80° C., using from about 20 to about 80 percent monomers and from about 20 to about 80 percent solvent. The following examples illustrate solution polymerization. However, bulk polymerization can also be utilized.

EXAMPLE 1

A 200 ml resin flask was charged with 40 grams (0.101 moles) of 2 acrylamido-2-methylpropanesulfonic acid sodium salt aqueous solution (58% monomer, 42% $H_2O$), 4.3 g (0.033 moles) of t-butylacrylamide (t-BAA), 0.014 g (0.00016 mol) of sodium bicarbonate ($NaHCO_3$) and 20 g of MeOH. A nitrogen purge at 0.1 SCFH was begun and the mixture was heated to 70° C. with stirring.

In a separate beaker 0.014 g. (0.00006 mol) of sodium persulfate ($Na_2S_2O_8$) was dissolved in 3 g of $H_2O$. This solution was taken up in a 20 ml syringe. The syringe was placed on a syringe pump which was set to deliver 0.07 ml/minute.

The $Na_2S_2O_8$ solution was added, via the syringe pump, to the resin flask over a 45 minute period. The two monomers combined made up 42.7% of the total mixture. Thirty minutes after addition was complete, 20 ml of $H_2O$ and 45 ml of MeOH were added and the mixture was stirred at 70° C. for three hours. The contents of the flask were poured into a crystallizing dish and dried at 80° C. for 20 hours to yield 27.5 g. (100%) of product containing 11.3% sulfur and 6.4% nitrogen and had an inherent viscosity of 2.28 dl/g at 30° C. in MeOH.

Additional Example 2 was prepared using the same method as used in Example 1, but different proportions of the monomers. The results are set forth in Table 1.

TABLE 1

| | Hydrophobic/Hydrophilic Monomer Molar Ratio | | | | | Copolymer Product | | | |
|---|---|---|---|---|---|---|---|---|---|
| Ex. | hydro-phobic* | hydro-philic** | % solids | NaHCO$_3$ (mole %) | Na$_2$S$_2$O$_8$ (mole %) | Initial MeOH (ml) | % Sulfur | % Nitrogen | Inherent Vis*** dl/g |
| 2 | 50 | 50 | 36 | 0.075 | 0.025 | 50 | 8.9 | 6.7 | 2.14 |

*Hydrophobic monomer = t-Butyl acrylamide
**Hydrophilic monomer = 2-Acrylamido-2-methylpropane sulfonic acid Na salt
***Inherent Viscosity at 30° C. in Methanol

EXAMPLE 3

Example of a Terpolymer Polymerization Reaction

A 500 ml resin flask was charged with 20.0g (0.157 moles) of tert-butylacrylamide, 41.0g (0.104 moles) of 2-acrylamido-2-methylpropane sulfonic acid sodium salt, 18.6 g (0.262 moles) of acrylamide, 0.045 g EDTA, and 700 g of deionized water.

The reaction mixture was stirred with a mechanical stirrer at 570 rpm and the contents were heated to 70° C. N$_2$ gas flow was blown subsurface at a rate of 0.5 scfh. The reaction was stirred at 70° C. for 0.5 hr before 0.0025 g (0.015 moles) of azobisisobutyronitrile were added to the reaction mixture and the reaction exothermed to 77° C. The reaction was stirred for 1.5 hr before another increment of 0.0038 g (0.023 mmoles) of azobisisobutyronitrile was added to the mixture.

After an additional 2 hr of mixing at 77° C., 100 g of water and 0.10 g of sodium meta bisulfite were added to the mixture. The contents were heated to 80° C. and held at this temperature for 1 hr before collecting the product as an aqueous solution.

EXAMPLE 4

Example of a Terpolymer Polymerization Reaction

A 2000 ml jacketed resin flask was charged with 90.0 g (0.435 moles) of 2 acrylamido-2-methylpropane sulfonic acid, 45.0 g (0.354 moles) of tert-butylacrylamide, 45.0 g (0.625 moles) of acrylic acid, and 100 g of deionized water.

The reaction mixture was stirred with a mechanical stirrer and the contents were heated to 60° C. N$_2$ gas flow was blown subsurface at a rate of 2.0 scfh. The reaction was stirred at 60° C. for 0.75 hr before 20.0 g of a 0.3 weight % hydrogen peroxide solution was added to the reaction mixture over a 5 min period. As the viscosity began to increase 1700 g of deionized water was added to the reaction mixture over a 4 hour period. Allow reaction mixture to stand at room temperature overnight.

The following day the solution was reheated to 60° C. and 82.0 g of a 50 weight % sodium hydroxide solution was added. The contents were held at this temperature for 4 hrs before collecting the product as an aqueous solution.
Testing of the Polymer as a Mist Suppressant
Grinder Antimist Test The grinder antimist test was used to measure the antimist performance exhibited (achieved) by various polymers of the present invention.

The grinder antimist test consists of a partially enclosed Boyar Schulz surface grinder, in which a 6" W×½" thick resin bonded medium grit wheel is used to machine a 1018 steel bar (1"×1"×6") at 3000 rpm. A gear pump is used to recirculate the diluted metalworking fluid in the system and feed the metalworking fluid from a 5 gallon capacity sump to the workpiece/grinding wheel interface at approximately 2 gpm flow rate and 80 psi pressure through a ⅛" nozzle. The grinding wheel/workpiece is enclosed within a 1.2 ft$^3$ plexiglas enclosure to capture and localize the mists produced during grinding as shown in FIG. 1.

A portable, real time aerosol monitor DataRAM® [MIE Instruments Inc., Bedford, Mass.] was used to continuously quantify the mist levels generated from the diluted end use metalworking fluid inside the grinder enclosure. The sampling probe was set at a height of 5.5' in the enclosure as shown in FIG. 1.

The DataRAM is a nephelometric monitor used to measure airborne particle concentration by sensing the amount of light scattered by the population of particles passing through a sampling volume. During its operation, a discrete amount of air volume (@2 liters/minute) is illuminated by a pulsed light emitting diode with the narrow band at 880 nm. The concentration of airborne particulate is then measured based upon the response of a silicon detector hybrid amplifier unit to the forward-scattered light intensity. The DataRAM provides concentration measurement ranges from 0.0001 mg/m$^3$ to 400 mg/m$^3$ (as Arizona dust primary standard calibration).

The air sampling in the grinder experiment was done under stagnant conditions so as to exaggerate and maximize the mist concentrations in the enclosure. The sampling probe was set at a height of 5.5' in the enclosure as shown in FIG. 1.

Mist concentration generated by an end use metalworking fluid without any polymer was first used to establish a baseline. The grinding test consisted of an idling cycle where the recirculating metalworking fluid was sprayed on the revolving wheel/steel workpiece interface for 15 minutes [Step A]. Following the idling cycle, grinding was initiated in which the steel piece surface was machined in incremental sweeps of 0.001" for a period of 30 minutes [Step B]. The sequence of steps A and B was repeated twice with the end use metalworking fluid (without the polymer) to establish baseline mist levels.

After establishing baseline mist levels, the metalworking fluid in the grinder sump was treated with various antimist polymers including the polymer useful in the present invention. The sequence of ambient air sampling of idling and grinding steps A and B, as described above, was repeated under identical grinding and mist sampling conditions as used for the baseline. The mist reduction performance derived from the polymers present in the metalworking fluids was calculated by comparing mist levels generated of the baseline metalworking fluid (without polymer) with those treated with the antimist polymer. The results are listed in Table 2.

The amount of mist reduction (% antimist or % mist reduction) performance achieved (exhibited) from candidate antimist polymers was calculated as follows:

% mist reduction=(mist concentration after polymer add/mist concentration before polymer add)×100

The effective amount of antimist performance (% mist reduction) achieved by the antimist polymers of the present invention is from about 5% to 100% mist reduction, preferably from about 40% to 100% mist reduction over the baseline, as measured according to the grinder antimist test.

TABLE 2

| # | Antimist Polymer | Metalworking Fluid | Treat Rate, ppm | % Mist Reduction (Grinder) |
|---|---|---|---|---|
| 1 | Example 2 | 5% soluble oil emulsion* | 500/1000 | 35/45 |
| 2 | Example 2 | 5% semisynthetic emulsion** | 1000 | 40 |
| 3 | Example 2 | 5% synthetic fluid*** | 1000 | 43 |
| 2 | Example 3 | 5% soluble oil emulsion | 500/1000 | 55/65 |
| 3 | Example 3 | 5% semisynthetic emulsion | 500/1000 | 55/65 |
| 6 | Example 3 | 5% synthetic fluid | 500/1000 | 37/51 |
| 7 | Example 4 | 5% soluble oil emulsion | 1000 | 66 |
| 8 | Example 4 | 5% semisynthetic emulsion | 1000 | 69 |
| 9 | Example 4 | 5% synthetic fluid | 1000 | 67 |

*soluble oil emulsion = M3C99A (Chrysan Industries, oil-in-water emulsion)
**semisynthetic emulsion = Dascool 2229 (DA Stuart, oil-in-water emulsion)
***synthetic fluid = Microcut 521A (Quaker Chemical, oil free fluid)

Methods of Using and Resultant Compositions Formed Thereof

The method of using the aqueous composition or dispersion containing the water-soluble or water-dispersible synthetic polymer according to the present invention imparts aerosol control and shear stability to metal working fluid compositions, and when added to a metal working fluid composition, forms a resultant metal working fluid composition exhibiting aerosol control and shear stability.

The metal working fluid compositions of the present invention include aqueous based, oil-free compositions. In their simplest form, these compositions include water, and the aqueous composition or dispersion containing a water-soluble or water-dispersible synthetic polymer of the present invention.

The metal working fluids of the present invention may also be oil-in-water emulsions. The emulsion compositions contain the same types and amounts of antimisting polymers as the purely aqueous compositions discussed above. The compositions may also contain the property improving additives which have been used in the purely aqueous fluids noted above.

The oils used in the emulsion compositions may include petroleum oils, such as oils of lubricating viscosity, crude oils, diesel oils, mineral seal oils, kerosenes, fuel oils, white oils, and aromatic oils. Liquid oils include natural lubricating oils, such as animal oils, vegetable oils, mineral lubricating oils, solvent or acid treated mineral oils, oils derived from coal or shale, and synthetic oils. Synthetic oils include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1octenes), poly(1-decenes); alkyl benzenes, such as dodecylbenzenes, tetradecylbenzenes, dinonylbenzenes, di-(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

Alkylene oxide polymers and derivatives thereof where terminal hydroxy groups have been modified by esterification, etherification etc. constitute another class of synthetic oils. These are exemplified by polyoxyalkylene polymers prepared by the polymerization of ethylene oxide or propylene oxide, the alkyl and aryl ethers of these polyoxyalkylene polymers such as methyl-polyisopropylene glycol ethers, diphenyl and diethyl ethers of polyethylene glycol; and mono and polycarboxylic esters thereof, for example, the acetic esters, mixed $C_3$–$C_8$, fatty acid esters and $C_{13}$ OxO diester of tetraethylene glycol. Simple aliphatic ethers may be used as synthetic oils, such as, dioctyl ether, didecyl ether, di(2-ethylhexyl) ether.

Another suitable class of synthetic oils comprises the esters of fatty acids such as ethyl oleate, lauryl hexanoate, and decyl palmitate. The esters of dicarboxylic acids such as phthalic acid, succinic acid, maleic acid, azelaic acid, sebacic acid, fumaric acid, adipic acid, linoleic acid dimer, malonic acid, alkyl malonic acids, alkenyl malonic acids with a variety of alcohols such as butyl alcohol, hexyl alcohol, dodecyl alcohol, 2-ethylhexyl alcohol, ethylene glycol, diethylene glycol monoethyl ether, propylene glycol. Specific examples of these esters include dibutyl adipate, di(2-ethylhexyl) sebacate, di-n-hexyl fumarate, dioctyl sebacate, diisoctyl azelate, dioctyl phthalate, didecyl phthalate, dieicosyl sebacate, the 2 ethylhexyl diester of linoleic acid dimer, and the complex ester formed by reacting one mole of sebacic acid with two moles of tetraethylene glycol and two moles of 2 ethyl-hexanoic acid.

The ratio of oil to water may vary from about 1:5 to about 1:200. Any oil-in-water emulsifier may be used to prepare the emulsions of the present invention. Emulsifiers may be single materials or may be mixtures of surfactants. Typical emulsifiers include alkali metal sulfonates and carboxylates, salts derived from the reaction product of carboxylic acylating agents with amines and hydroxylamines, polyols, polyether glycols, polyethers, and polyesters and the like. *The Kirk-Othmer Encylopedia of Chemical Technology* (3 rd. Edition V. 8 pp. 900–930) provides a good discussion of emulsions and provides a list of emulsifiers useful in preparation of oil-in-water emulsions.

Amount of Antimist Polymer in a Resultant Composition

In a metal working fluid composition, it is desireable to include the aqueous composition or dispersion containing the water-soluble or water-dispersible synthetic polymer of the present invention at a level which is effective to impart aerosol control and shear stability. However, even with recovery of used metal working fluids, some loss occurs during use, and the aqueous composition or dispersion containing the water-soluble or water-dispersible synthetic polymer is an expense. Accordingly, it is also desirable to use the polymers at the lower levels of their effective concentration range. However, many factors affect the level of polymer required to achieve the desired effect. For example, the chemical composition of the metalworking fluid, the shape of the tool and the work piece, and the type and severity of a particular application, each influence the amount of aerosol control and shear stability required. The polymer amount needed for optimum performance will vary according to the particular application, in amounts that provide the most desirable effects.

Typically, the aqueous composition or dispersion containing a water-soluble or water-dispersible synthetic polymer is used in an amount of from about 0.0001 to about 50 weight percent, preferably from about 0.002 weight percent to about 0.1 weight percent, based upon the total weight of the resultant composition. A mixture of the different types of polymers according to the present invention may also be used in the aqueous composition or dispersion to prepare the resultant end use metal working fluids, wherein the mixture is in an amount of from about 0.0001 to about 50 weight percent, , preferably from about 0.002 weight percent to about 0.1 weight percent, based upon the total weight of the resultant composition.

Other Components or Additives

In addition to the aqueous composition or dispersion containing the polymer of the present invention, the resultant metal working fluid compositions may contain additives to improve the properties of the particular resultant composition. These additives are those additives known in the art for the particular resultant composition, in amounts that provide the most desirable effects.

For example, these metal working fluid additives include anti-foam agents, metal deactivators, and corrosion inhibitors, antimicrobial, anticorrosion, extreme pressure, antiwear, antifriction, and antirust agents. Such materials are well known to those skilled in the art.

Typical anti-friction agents include overbased sulfonates, sulfurized olefins, chlorinated paraffins and olefins, sulfurized ester olefins, amine terminated polyglycols, and sodium dioctyl phosphate salts. Useful anti-foam agents include: alkyl polymethacrylates, and polymethylsiloxanes. Metal deactivators include materials such as tolyltriazoles. Corrosion inhibitors include carboxyliciboric acid diamine salts, carboxylic acid amine salts, alkanol amines, alkanol amine borates and the like.

It will be readily apparent to those skilled in the art that various changes and modifications of an obvious nature may be made without departing from the spirit of the invention, and all such changes and modifications are considered to fall within the scope of the present invention as defined by the appended claims.

What is claimed is:

1. A metal working fluid composition comprising an aqueous composition or dispersion containing a water-soluble or water-dispersible synthetic polymer, wherein said aqueous composition or dispersion imparts antimist performance in combination with shear stability to said composition, whereby said metal working fluid composition retains effective antimist properties even after it is subjected to a shear rate of from about 99,000 to about 1,000,000 s$^{-1}$, and a shear stress of from about 30,000 to about 500,000 pascals;

wherein said synthetic polymer is formed by polymerizing (A) a hydrophobic monomer selected from the group consisting of A(I) an alkyl substituted acrylamide compound having the formula:

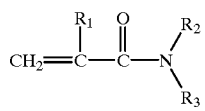

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and A(II) an acrylate ester of the following formula:

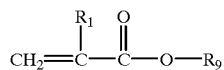

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

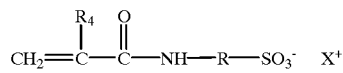

wherein $R_4$ is a hydrogen or a methyl group and R is an aliphatic or aromatic hydrocarbon group containing from 2 to 12 carbon atoms; B(II) acrylamido disulfonic acids having the formula:

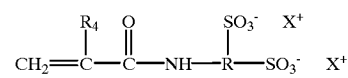

wherein $R_4$ is a hydrogen or a methyl group and R is an aliphatic or aromatic hydrocarbon group containing from 2 to 12 carbon atoms, and B(III) a styrene sulfonic acid having the formula:

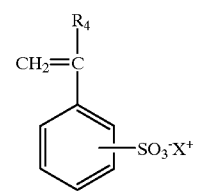

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

wherein $R_5$, $R_6$, $R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99; and (C) at least one additional monomer unit that is polymerizable with said hydrophobic monomer and said hydrophilic monomer; wherein (C) is acrylic acid, a metal salt thereof, acrylamide, or a mixture thereof.

2. The metal working fluid composition of claim 1, wherein said aqueous composition or dispersion comprising a water-soluble or water-dispersible synthetic polymer imparts an effective amount of antimist performance to said metal working fluid composition as measured by a grinder antimist test.

3. The metal working fluid composition according to claim 2, wherein said effective amount of antimist performance is from about 5.0% to 100% mist reduction as measured by said grinder antimist test.

4. The metal working fluid composition according to claim 2, wherein said effective amount of antimist performance is from about 40.0% to 100% mist reduction as measured by said grinder antimist test.

5. The metal working fluid composition of claim 1, further comprising, at least one metal working fluid additive, wherein said aqueous composition or dispersion is contained in said metal working fluid composition in an amount of from about 0.0001 to about 50 weight percent, based upon the total weight of said metal working fluid composition.

6. The metal working fluid composition according to claim 1, wherein said polymer comprises from about 0.1% to about 80%, preferably from about 5% to about 50%, and more preferably from about 15% to about 30%, by weight of said (C) monomer unit.

7. A method of imparting antimist performance and shear stability to a metal working fluid composition, comprising including therein an aqueous composition or dispersion comprising a water-soluble or water-dispersible synthetic polymer, whereby said metal working fluid composition retains effective antimist properties even after it is subjected to a shear rate range of from about 99,000 to about 1,000,000 $s^{-1}$, and a shear stress range of from about 30,000 to about 500,000 pascals;

wherein said synthetic polymer is formed by polymerizing (A) a hydrophobic monomer selected from the group consisting of A(I) an alkyl substituted acrylamide compound having the formula:

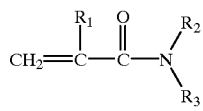

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and A(II) an acrylate ester of the following formula:

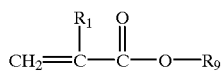

where $R_1$ is a hydrogen or a methyl group and $R_9$ is a hydrocarbyl group containing between 1 and 20 carbon atoms; and (B) a hydrophilic monomer selected from the group consisting of B(I) acrylamido sulfonic acids having the formula:

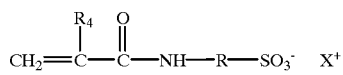

wherein $R_4$ is a hydrogen or a methyl group and R is an aliphatic or aromatic hydrocarbon group containing from 2 to 12 carbon atoms; B(II) acrylamido disulfonic acids having the formula:

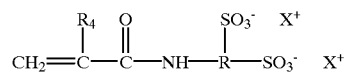

wherein $R_4$ is a hydrogen or a methyl group and R is an aliphatic or aromatic hydrocarbon group containing from 2 to 12 carbon atoms, and B(III) a styrene sulfonic acid having the formula:

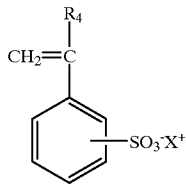

wherein $R_4$ is a H or a methyl group, and $X^+$ is H or a cation selected from the group consisting of alkali metal cations, alkaline earth cations, cations of the transition metals: Sc, Ti, V, Cr, Mn, Fe, Co, Ni, Cu, Zn, and ammonium cations of the following formula:

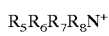

wherein $R_5$, $R_6$, $R_7$, and $R_8$ are independently hydrogen or hydrocarbyl groups, provided that the total number of carbon atoms in an ammonium cation does not exceed 21 carbon atoms, and further provided that if A is A(I), then the ratio of moles of A to B is from about 95:5 to about 1:99, and if A is A(II), then the ratio of moles of A to B is from about 75:25 to about 1:99; and (C) at least one additional monomer unit that is polymerizable with said hydrophobic monomer and said hydrophilic monomer; wherein (C) is acrylic acid, a metal salt thereof, acrylamide, or a mixture thereof.

8. The method according to claim 7, wherein said polymer comprises from about 0.1% to about 80%, preferably from about 5% to about 50%, and more preferably from about 15% to about 30%, by weight of said (C) monomer unit.

9. The method of claim 7, wherein said aqueous composition or dispersion comprising a water-soluble or water-dispersible synthetic polymer imparts an effective amount of antimist performance to said metal working fluid composition as measured by a grinder antimist test.

10. The method according to claim 9, wherein said effective amount of antimist performance is from about 5.0% to 100% mist reduction as measured by said grinder antimist test.

11. The method according to claim 9, wherein said effective amount of antimist performance is from about 40.0% to 100% mist reduction as measured by said grinder antimist test.

* * * * *